(12) United States Patent
Vasic et al.

(10) Patent No.: US 8,894,260 B2
(45) Date of Patent: Nov. 25, 2014

(54) ANNULAR LIGHT GUIDE ILLUMINATOR AND OPTICAL SCANNER

(75) Inventors: Milan Vasic, Geneva (CH); Nicola Duca, Monthey (CH)

(73) Assignee: Sicpa Holding SA, Prilly (CH)

( * ) Notice: Subject to any disclaimer, the term of this patent is extended or adjusted under 35 U.S.C. 154(b) by 531 days.

(21) Appl. No.: 13/262,111

(22) PCT Filed: Mar. 21, 2009

(86) PCT No.: PCT/IB2009/005137
§ 371 (c)(1),
(2), (4) Date: Dec. 19, 2011

(87) PCT Pub. No.: WO2010/112950
PCT Pub. Date: Oct. 7, 2010

(65) Prior Publication Data
US 2012/0092131 A1    Apr. 19, 2012

(51) Int. Cl.
B64D 47/06 (2006.01)
F21V 5/00 (2006.01)
G09F 13/18 (2006.01)
F21V 8/00 (2006.01)

(52) U.S. Cl.
CPC .................................... *G02B 6/0045* (2013.01)
USPC .......................................... 362/559; 362/347

(58) Field of Classification Search
CPC ......... G02B 21/00; G02B 21/06; G02B 21/36
See application file for complete search history.

(56) References Cited

U.S. PATENT DOCUMENTS 3,509,711 A  *  5/1970  Kaniwec .................... 368/249
6,264,106 B1    7/2001  Bridgelall
6,352,204 B2    3/2002  Hattersley et al.
6,362,861 B1 *  3/2002  Hertz et al. ................ 349/69
7,357,326 B2    4/2008  Hattersley et al.
7,370,801 B2    5/2008  Hattersley et al.
7,419,098 B2    9/2008  Hyde et al.
2006/0152931 A1 * 7/2006  Holman ..................... 362/297
2006/0175409 A1   8/2006  Reichenbach et al.
2007/0084931 A1   4/2007  Watanabe et al.
2008/0038844 A1 * 2/2008  Seul ........................... 436/526
2008/0128499 A1   6/2008  Chen et al.
2009/0003009 A1   1/2009  Tessnow et al.

FOREIGN PATENT DOCUMENTS

GB        402781      11/1933
JP     61 080471       4/1986
JP      7-020641       4/1995
JP    2000-035608      2/2000

(Continued)

OTHER PUBLICATIONS

Japanese Office Action conducted in counterpart for Japanese Patent Application No. 2012-502818 (Jul. 2, 2013) (with English language translation).
Colombian Office Action conducted in Colombian Patent Application No. 11-128474 (Jun. 12, 2013) (w/ redacted letter that includes partial English language translation).

(Continued)

*Primary Examiner* — Donald Raleigh
(74) *Attorney, Agent, or Firm* — Greenblum & Bernstein, P.L.C.

(57) ABSTRACT

The disclosed annular light guide illuminator (10) is operable to guide light from its entry surface (12) to its exit surface (16) for illuminating a zone (17) at its distal end (19), and comprises a truncated-cone-shaped inner cavity (18) of which base opens onto said distal end (19), and of which truncated summit (20) opposite to said base opens onto an inner hole portion (21) for back transmitting light reflected/emitted from said zone. An optical scanner implementing said illuminator is also disclosed.

17 Claims, 18 Drawing Sheets

(56) References Cited

FOREIGN PATENT DOCUMENTS

| JP | 2001-124998 | 5/2001 | | |
|---|---|---|---|---|
| JP | 2007 172547 | 7/2007 | | |
| WO | 99/49347 | 9/1999 | | |
| WO | WO 9949347 A1 * | 9/1999 | ............. | G02B 21/00 |

OTHER PUBLICATIONS

Israel Office Action conducted in counterpart Israel Application (Oct. 29, 2013).
Australian Office Action conducted in counterpart Australian Appln. No. 2009343469 (Apr. 24, 2014).

* cited by examiner

ANNULAR LIGHT GUIDE ILLUMINATOR AND OPTICAL SCANNER

TECHNICAL FIELD

The present invention relates to the technical field of optical devices for illuminating a zone to be imaged, and corresponding imaging devices. Particularly, the invention relates to imaging devices such as optical scanners used for scanning a zone on an item in order to detect/read some marking on said item.

BACKGROUND OF THE INVENTION

Imaging devices are of common use for scanning a marking on an item, as illustrated, for example, with the optical scanners disclosed in the U.S. Pat. Nos. 6,352,204 B2, 7,357, 326 B2, 7,370,801 B2 and 7,419,098 B2, Such marking may be a barcode (linear or 2-D like a datamatrix) or any other pattern including identification data corresponding to the item. In some cases, a marking on a surface of an item is invisible or hardly visible to the unaided eye (a pattern printed in phosphorescent, luminescent or fluorescent inks, for example) and/or can be detected only under illumination with specific light, in the UV or IR regions of the spectrum for example. Moreover, even if the marking can be detected with visible light, its size may be small or it may include fine details of small scales so that said marking is difficult to read, which makes good illumination conditions necessary. Conventional light sources for scanners (depending on which part of the spectrum is to be used for detection of the marking) are incandescent lamps (typically for wavelengths between about 400 nm to about 2500 nm), flash lamps (like Xenon high-pressure flash lamp, for example), laser or Light-Emitting-Diodes (LEDs, emitting in the UV, visible or IR regions, typically for wavelengths from about 250 nm to about 1 micron). Conventional photodetectors for scanners are cameras of the CMOS or CCD type, photodiodes (single or arrays), phototransistor or photoresistance circuits, linear CMOS or CCD sensors.

A conventional optical scanner (which may be hand-held or fixed) comprises a light source (which may include filters) for illuminating a zone on an item with appropriate light, an illuminator (which may include focusing means) for delivering light received from said light source appropriately to said zone, means for collecting light reflected from said zone and transmitting it back to a photodetector, a processing unit for analyzing a signal delivered by the photodetector (and detecting/reading or decoding data associated with a marking within said zone), and a control unit for controlling the illumination source and the processing unit.

Conventional hand-held scanners (either corded or cordless) generally further include a power module for supplying the scanner with power and may also comprise a radio module for wireless communication (over Wi-Fi for example), a display module (a liquid crystal display LCD, or kinescope display, for example) for displaying measured data or scanning parameters, and a controlling interface for inputting scan conditions (including buttons having multiple functions and an ON/OFF switch button). Conventional optical scanners may further incorporate an RFID (Radio Frequency Identification) circuit for reading RFID chips on a scanned item (see, for example, U.S. Pat. No. 6,264,106 B1), thus allowing the scanner to read a combined optical/RFID marking.

A classical problem with an optical scanner is to illuminate a zone, at a level of an item's reflective surface comprising a marking, homogeneously and with sufficient light intensity, so that the detector of the scanner is capable to read said marking from the reflected light, while minimizing stray light and avoiding "hot spots" on the illuminated surface which degrade the contrast and may cause severe image processing problems; the detection of the marking may even fail if the image sensor saturates. Moreover, the above mentioned problem can, be enhanced in case of curved reflective surfaces.

The above cited prior art documents have considered this problem (see, for example, col. 1, lines 36-51 of U.S. Pat. No. 6,352,204 B2; col. 2, lines 16-19 of U.S. Pat. No. 7,357,326 B2; col. 2, lines 6-17 of U.S. Pat. No. 7,370,801 B2 and col. 2, lines 1-11 of U.S. Pat. No. 7,419,098 B2) and proposed some specific illumination techniques.

Document U.S. Pat. No. 6,352,204 B2 discloses illuminating a zone on an item at low incidence angle so as to minimize a "wash out effect" caused by shiny or irregular surfaces. However, there is a remaining problem with stray light.

Documents U.S. Pat. Nos. 7,357,326 B2, 7,370,802 B2 and 7,419,098 B2 disclose using a illuminator having a nosepiece, in the shape of a truncated pyramid, for directly illuminating a zone on an item by placing the converging end of said nosepiece near said zone so that light from the light source reaches only the intended zone while being shielded from much of the ambient light. The opposite diverging end of the nosepiece receives light from the light source. However, there are still some problems with direct reflection of light (back to the photodetector) on the internal face of the nosepiece (even if this face may be an irregularly uneven reflective one so as to scatter light) and also possible "light spots" on the reflective surface of the item.

SUMMARY OF THE INVENTION

The present invention is aimed at providing an illumination technique that avoids the drawbacks of the prior art.

The invention also relates to an optical scanner, particularly a hand-held optical scanner, for detecting and reading a marking at a surface of an item, which implements such illumination technique.

According to one aspect of the invention, an annular light guide illuminator is operable to guide light received at an entry surface to an exit surface for illuminating a zone at a distal end of said light guide illuminator, and to allow for the transmission, through an inner hole portion of said light guide illuminator, of light reflected/emitted from said zone, wherein:

said exit surface is a boundary surface portion of a truncated-cone-shaped inner cavity of which base opens onto said distal end, and of which truncated summit opposite to said base opens onto said inner hole portion; and said exit surface is operable to refract light received from the entry surface to irradiate said zone with a substantially uniform light intensity distribution.

With this annular structure of the illuminator, light coming from the light source is guided within the annular light guide, thus without travelling through the inner hollow portion of the light guide, and the exit surface of the light guide constitutes a boundary of an inner cavity which is tapered from adjacent its base, to be placed near the zone to be illuminated, toward its truncated summit forming a bottleneck inner hole portion for transmitting back light reflected from the zone. This configuration has the advantage to eliminate back transmission, through the inner hole, of light originating directly from the exit surface. Thus, stray light due to internal reflection can be eliminated. Moreover, the distal end of the illuminator being placed near, or in contact with, the target zone to be irradiated, it constitutes a nosepiece which eliminates much of stray light coming from external sources. Moreover, the shape of the exit surface is chosen such that light refracted toward the base of the inner cavity is uniform enough to avoid forming light spots on the illuminated surface near, or in near contact with, said base. All these features contribute to improve the detection of a marking by a scanner equipped with such illuminator, because the contrast of the marking is strongly enhanced by homogeneous illumination.

The illuminator of the invention may as well serve to transmit light emitted by a marking in the target zone (for example, in response of an excitation light transmitted through the exit surface, in case of a fluorescent or phosphorescent marking) through its inner hole portion.

Most useful shapes of portions of the exit surface may be simply estimated from the law of refraction (Snell's law) and the height and base area of the inner cavity. However, a simple shape like the plane one ordinarily suffices to provide good illumination conditions (for example, in case of an inner cavity like a truncated pyramid, for the portions of the surface of the inner cavity corresponding to the faces of said truncated pyramid). Another example of a simple shape providing good illumination conditions is an exit surface like a conical frustum (which corresponds to a straight generatrix). Better uniformity is obtained with a shape of the exit surface corresponding to a convex curved generatrix (the concavity of the curve being oriented toward the inner cavity). An even better uniformity is obtained if the generatrix is a parabola. Moreover, even if the wide base end of the inner cavity opens onto the zone to illuminate at the distal end of the light guide, the external overall shape of the illuminator forming a nosepiece may converge toward said distal end, thus concentrating lighting on the target zone for enhancing the readability of a marking within said zone.

The annular light guide illuminator according to the invention may be designed to guide light corresponding to an electromagnetic radiation comprised within the range from optical UV to optical IR (i.e. about 400 nm to about 2500 nm wavelength). The materials constituting the light guide have just to be selected according to the light to be guided, as known to a skilled person. The illuminator may also be designed for guiding electromagnetic waves of different wavelengths.

Although the annular light guide of the invention may be made hollow, i.e. with only inner and outer peripheral material faces for guiding light by reflection and a material exit face for irradiating the inner cavity by refracting some of the guided light (and possibly, a material entry face), a preferred embodiment of the invention corresponds to an annular light guide illuminator being a solid body, made of a substantially transparent material. Such material is selected so as to be substantially transparent for the light to be guided. The substantially transparent material of the solid body may be chosen from the group consisting of the glasses, the glass ceramic materials, the crystalline materials and the plastic materials. The crystalline material is preferably chosen from quartz, yttrium-aluminum garnet, and sapphire. The optical plastic material is preferably chosen from polymethylpentene (TPX), polymethyl methacrylate (PMMA), methyl methacrylate styrene copolymer (NAS), styrene acrylonitrile (SAN), polycarbonate (PC), and polystyrene (PS).

For avoiding stray radiation (for example, for protecting an operator from radiation), the annular light guide illuminator according to the invention may further comprise a shield made of a material which is opaque to the guided light on a portion of the outer peripheral surface of said light guide illuminator. In order to avoid stray light originating from the inner peripheral surface of the inner hole portion of the light guide, the illuminator according to the invention may further comprise a shield made of a material opaque to the guided light on a portion of an inner peripheral surface of said light guide illuminator, in the inner hole portion of the light guide illuminator. For example, the above shield may be a cover or a coating.

The annular light guide illuminator according to the invention may further comprise an RF antenna, mounted on a portion of its peripheral boundary surface, adapted to receive and transmit a RFID signal from/to an RFID chip at the zone level. This embodiment of the illuminator according to the invention, when used in a scanner, allows reading both optical symbols and RF data present at a target zone.

The annular light guide illuminator according to the invention is compatible with a conventional diffusive insert for scattering light (arranged, for example, at a level of the entry face). Nevertheless, in a preferred embodiment, the annular light guide illuminator has a portion of the exit surface, or of the entry surface, roughened so as to scatter the light travelling toward the target zone. This scattering enhances light uniformity at the target zone and may be obtained by conventional techniques like surface sanding or by forming regular or irregular uneven defects/patterns (serving as scattering centers) on the surface. Thus, the illuminator according to the invention does not depend on a diffusive insert between the light source and the illuminator and may therefore be made more compact.

The annular light guide illuminator according to the invention may be further adapted to receive an optical device to collect and transmit light reflected from the irradiated zone and transmitted through the inner hole. For example, the hollow portion of the annular light guide above the inner cavity (i.e. between the entry part of the light guide and the inner hole portion near the converging end of the inner cavity) may be provided with means for mounting such optical device. For example, these mounting means may include any groove, notch, protrusion or thread on the inner peripheral surface of the light guide (above the inner cavity), or any other fastening means (using glue, screws or inserted racks for example).

As explained above, the illuminator according to the invention has many advantages. Moreover, as light is guided within the annular guide, a great variety of overall shapes are possible for the illuminator, and the illuminator may thus be easily adapted to transfer radiation between specific light source configurations and a target zone while minimizing light losses and still having substantially uniform lighting conditions within said zone. As a result, a precise positioning of the illuminator's distal end onto the target zone to be scanned is not required in order to have substantially uniform illumination. Moreover, the shape of the distal end of the illuminator may also be adapted for an easier positioning in front of a target zone, as it is particularly useful in case the illuminator is mounted on a hand-held scanner. For example, the distal end may be slightly beveled without compromising uniformity of the lighting on the target zone.

This annular configuration also allows using a great variety of light sources, like incandescent lamps, discharge tubes, flash lamps, laser or LEDs (from UV to IR), or combinations of said light sources, for illuminating the entry surface. As the entry surface may be adapted to the light source, it is for example not necessary to use LEDs equipped with lenses: ordinary LEDs having a wide emission angle may be used instead. Also, filters may be easily disposed at the entry face and/or the exit surface.

Also, the hollow inner part of the light guide may be easily adapted for transmission of reflected light toward a great variety of photodetectors like, for example, those of a CMOS or CCD camera, photodiodes (single or arrays), phototransistor or photoresistance circuits, or linear CMOS or CCD sensors.

Another aspect of the invention relates to an optical scanner comprising;
- an annular light guide illuminator according to a previous aspect of the invention, as mentioned above, adapted to receive an optical device to collect and transmit light reflected from the irradiated zone and transmitted through the inner hole;
- a light source operable to illuminate the entry surface of said light guide illuminator; and
- a photo-detector operable to receive light transmitted by said optical device.

This optical scanner may comprise the above mentioned annular light guide illuminator, including an optional RF antenna, and may further include;
- a RF control circuit for sending an RFID signal to an RFID chip at said zone level, through said RF antenna; and
- a RFID reader operable to read an RFID signal received from said RFID chip.

The above mentioned optical scanner according to the invention may be a hand-held scanner including a power module for powering the scanner, and may further comprise at least one of wireless communication module, a display module for displaying measured data or scanning parameters, and a controlling interface for inputting scan conditions.

The present invention will be described more fully hereinafter with reference to the accompanying drawings in which like numerals represent like elements throughout the different figures, and in which prominent aspects and features of the invention are illustrated.

DETAILED DESCRIPTION

Figure 1A:
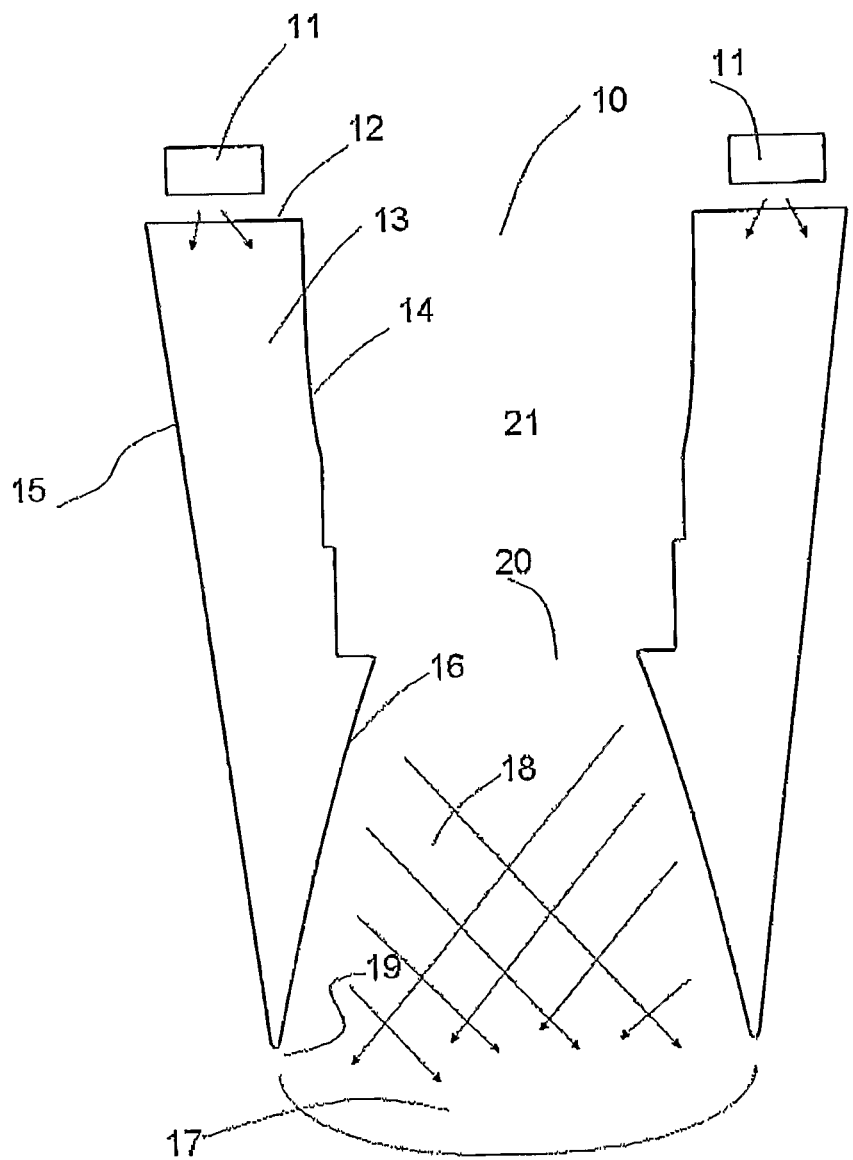
FIG. 1A-1C illustrate sectional views of annular light guide illuminators according to the invention.

The principle of an illuminator according to the invention is illustrated in FIG. 1A showing a sectional view of an annular light guide illuminator (10), with light sources (11) illuminating an entry surface (12) of the light guide (10). Light is guided within a guiding portion (13) of the light guide (10), by reflection between an inner peripheral surface (14) and an outer peripheral surface (15), to an exit surface (16) which refracts light toward a target zone (17) at a surface of an item (not represented). The exit surface (16) constitutes a boundary surface, preferably of convex curved shape, of an inner truncated-cone-shaped cavity (18) with a diverging base end (19) which opens onto the target zone (17) and a truncated summit (20) (i.e. a converging end opposite to the base end) which opens onto an inner hole portion (21) of the light guide.

Figure 1B:
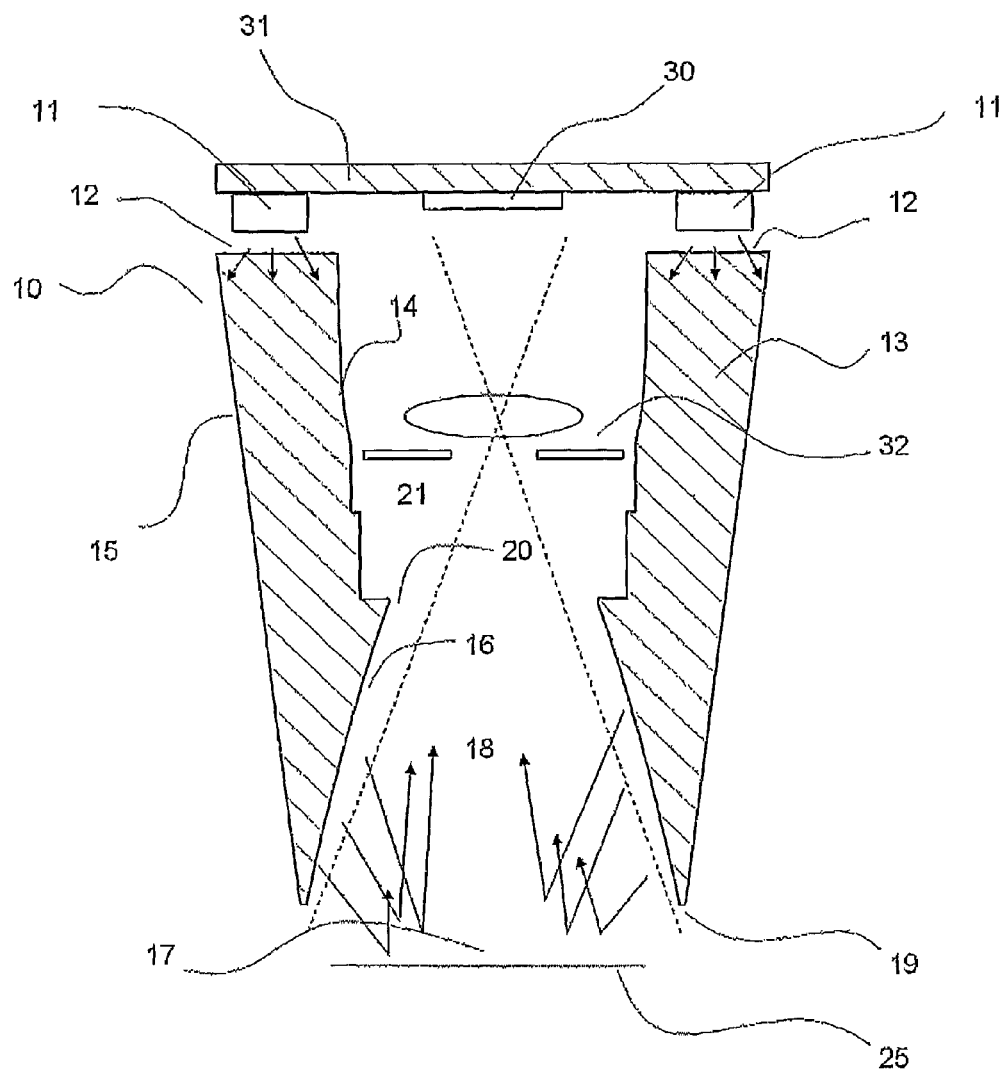
Figure 1C:
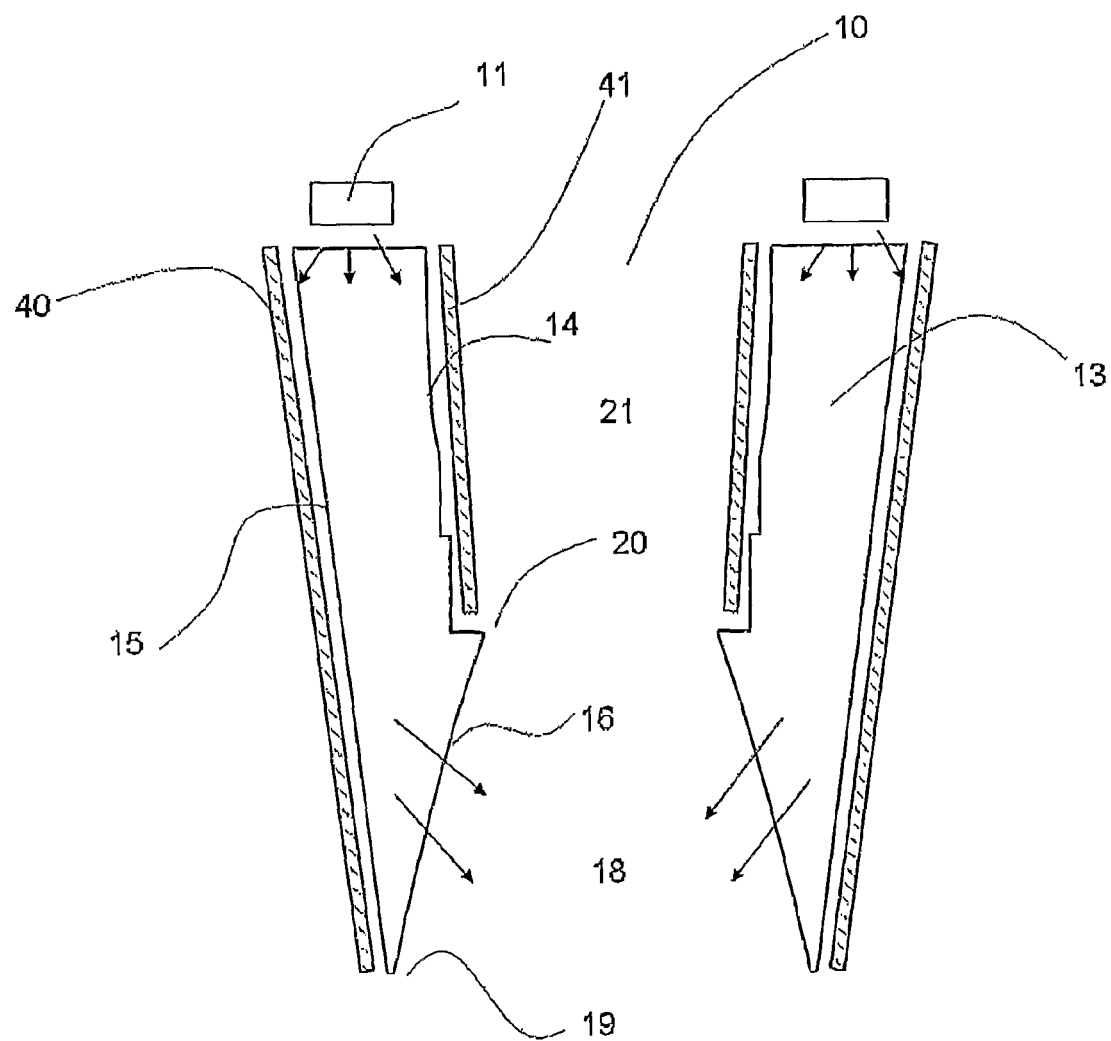
Figure 1D:
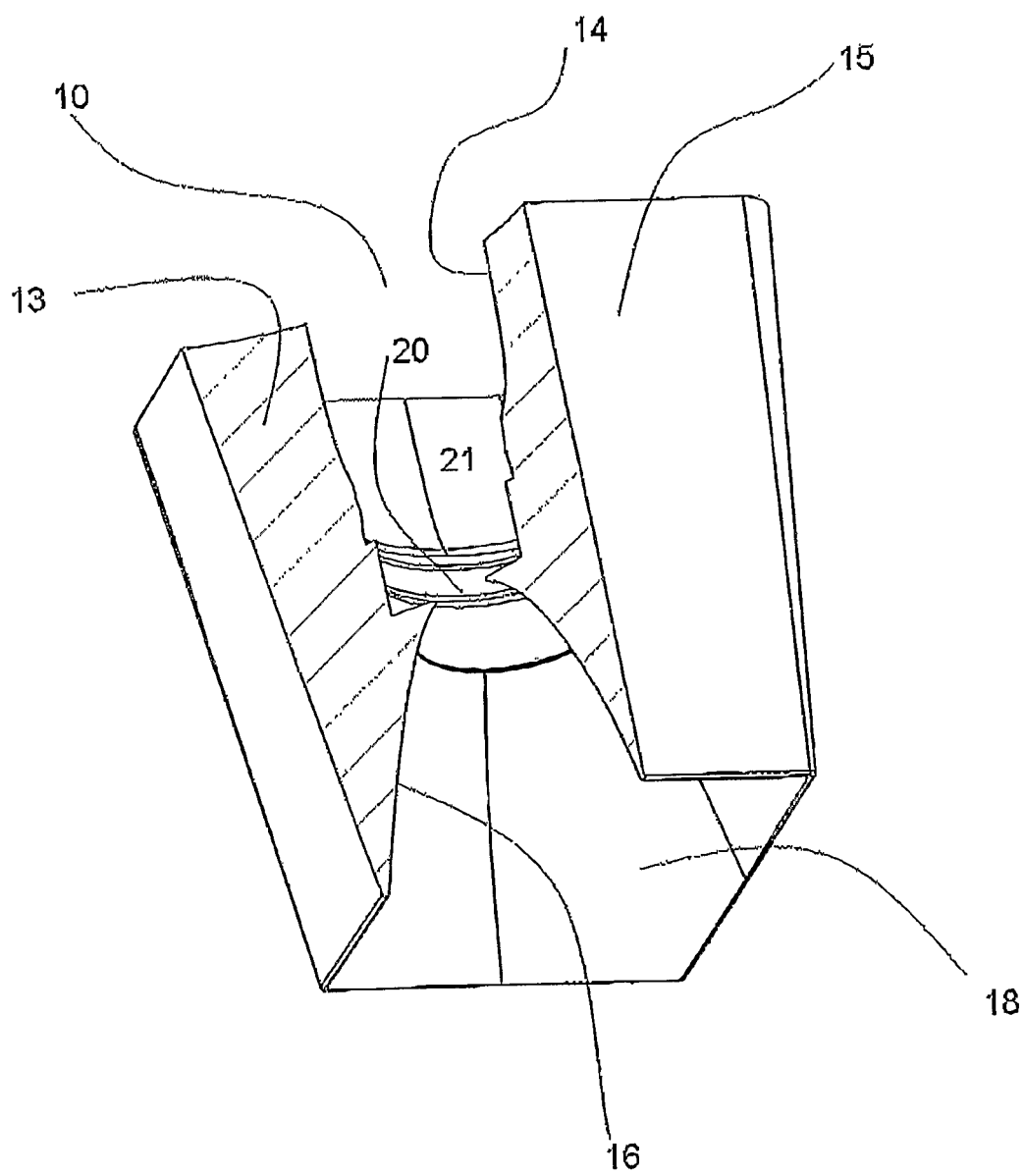
FIG. 1D illustrates a partially cut-away perspective view of the annular light guide illuminator of FIG. 1A or 1B.

FIG. 1D shows a partially cut-away perspective view of the annular light guide illuminator (10), in case of a transparent solid body guide (13).

FIG. 1B illustrates a cross-sectional view of an illuminator (10) equipped with light sources (11) disposed all around the entry surface (12) and a photodetector (30) for detecting light retro-diffused (reflected) from the target zone (17) at a surface (25) of an item, and transmitted through the inner cavity (18) and inner hole portion (21). In the illustrated example, the photodetector (30) and the light sources (11) are mounted on a same support (31) above the entry surface of the illuminator. The inner peripheral boundary surface (14) of the annular light guide (10) has protrusions for the easy mounting of an optical device (32) within the inner hollow portion (21), said optical device (32) serving in this case for focusing light onto the photodetector (30).

FIG. 1C illustrates a cross-sectional view of an illuminator (10) equipped with a shield (40, 41) which, in this example, is a hollow shield (or cover) made of opaque material disposed around the inner and outer peripheral surfaces (14, 15) of the annular light guide. The outer portion (40) of the shield covers the outer peripheral surfaces (15) and the inner portion (41) of the shield covers the inner peripheral surface (14), and thus, there is no stray light from the guiding portion (13) of the illuminator, neither toward the exterior nor toward the inner hole portion of the light guide. This configuration of the shield allows protecting the eyes of an operator from light lost through the outer guiding surface (15), as well as a photodetector (see FIG. 1B) or other optical device from stray light directly transmitted through the inner guiding surface (14). The shield may as well be a coating on the guiding surfaces of the light guide (for example, a layer of metal formed on these surfaces or an opaque composition coating applied onto them).

Figure 2A:
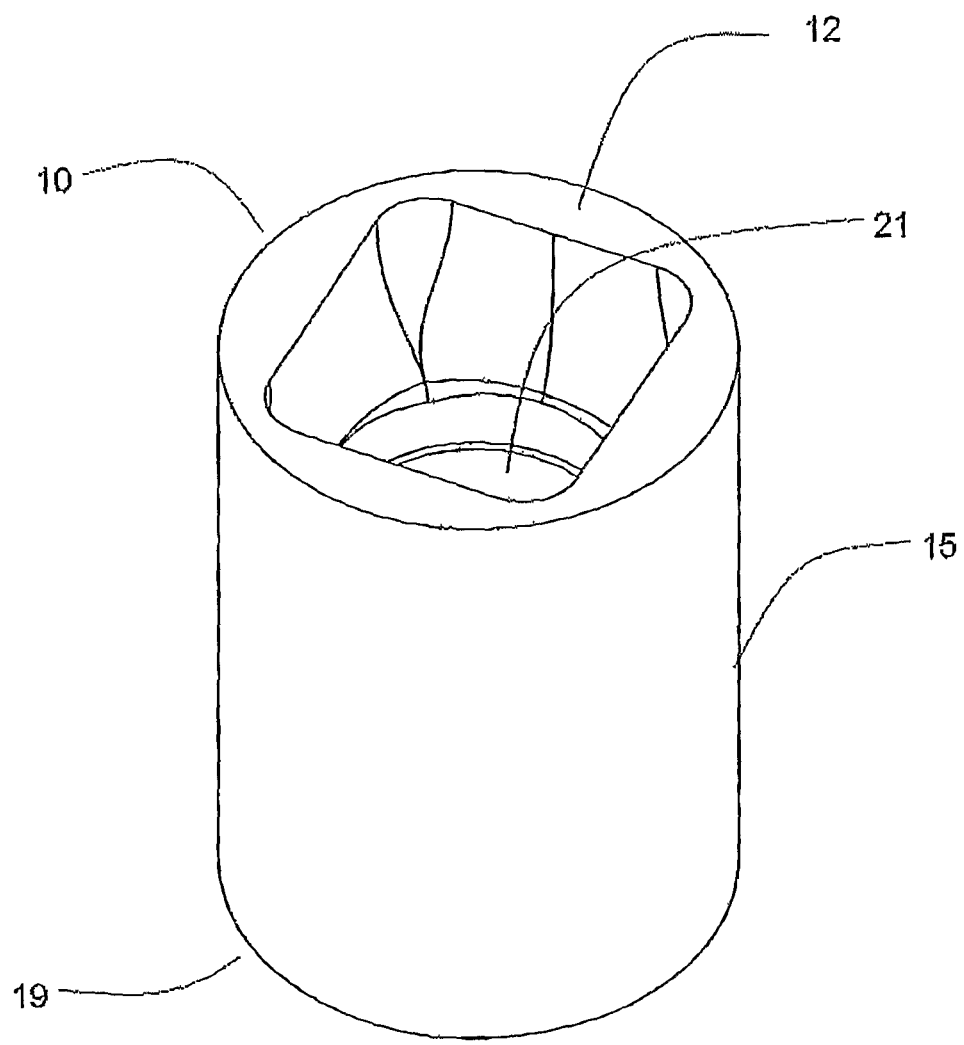
FIG. 2A-2D illustrate some perspective views of annular light guide illuminators of different shapes according to the invention.
Figure 2B:
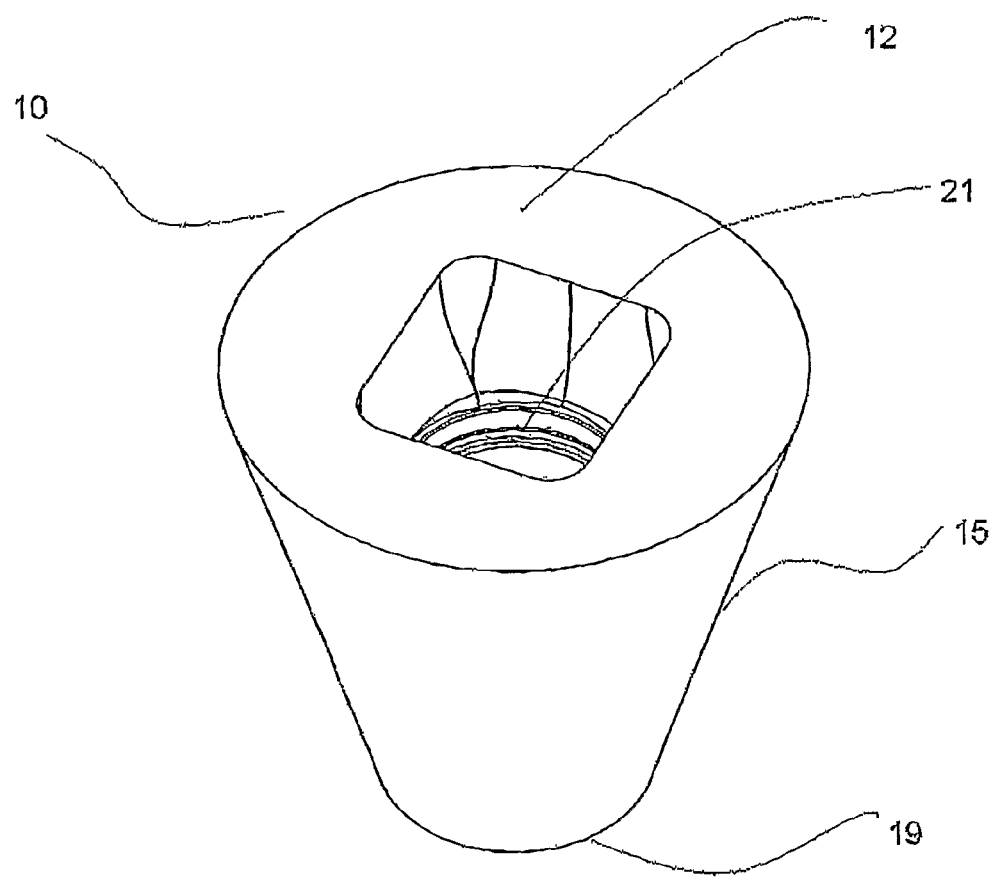
Figure 2C:
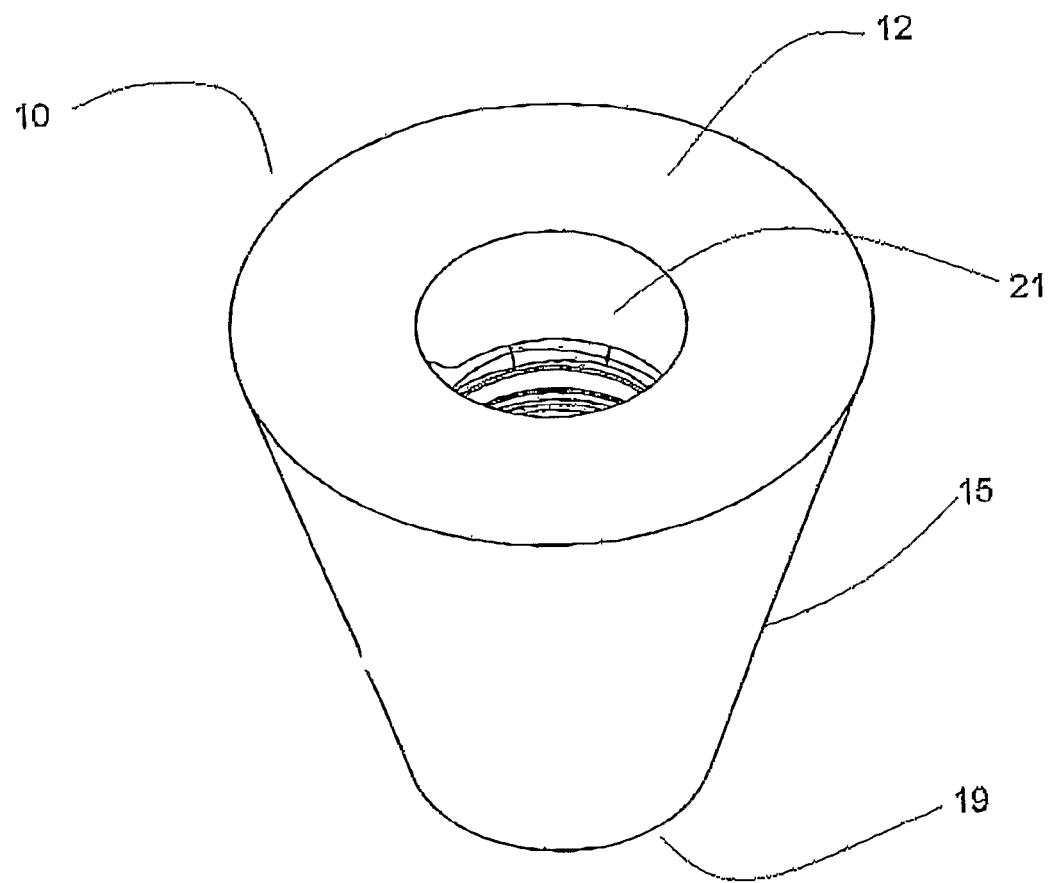
Figure 2D:
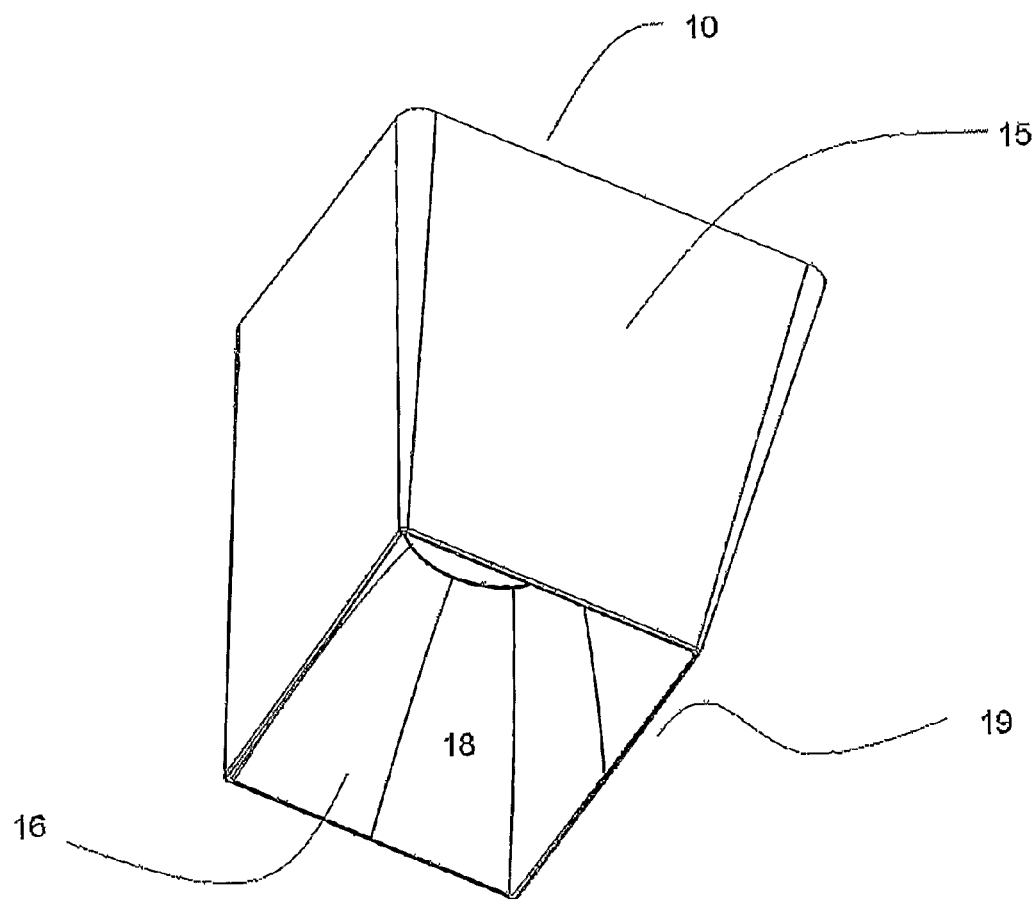

The overall cross-section shape of the annular light guide illuminator according to the invention is not limited to that of truncated square pyramid (see FIG. 2D), but may have any shape of which topology is annular. Also, the shape of the inner hole portion may be arbitrary and only must let reflected light coming from the target zone (or light emitted by a target surface on an item) to be transmitted to a photodetector. The annular shape may even be bent at the level of the inner hole portion (21), if a mirror is used to direct light received from the inner cavity (18) toward the photodetector, for example. Some illustrative, non-limitative, examples of shapes (overall shape, inner cavity shape, inner hole shape) are given in FIG. 2A-2C.

Figure 3A:
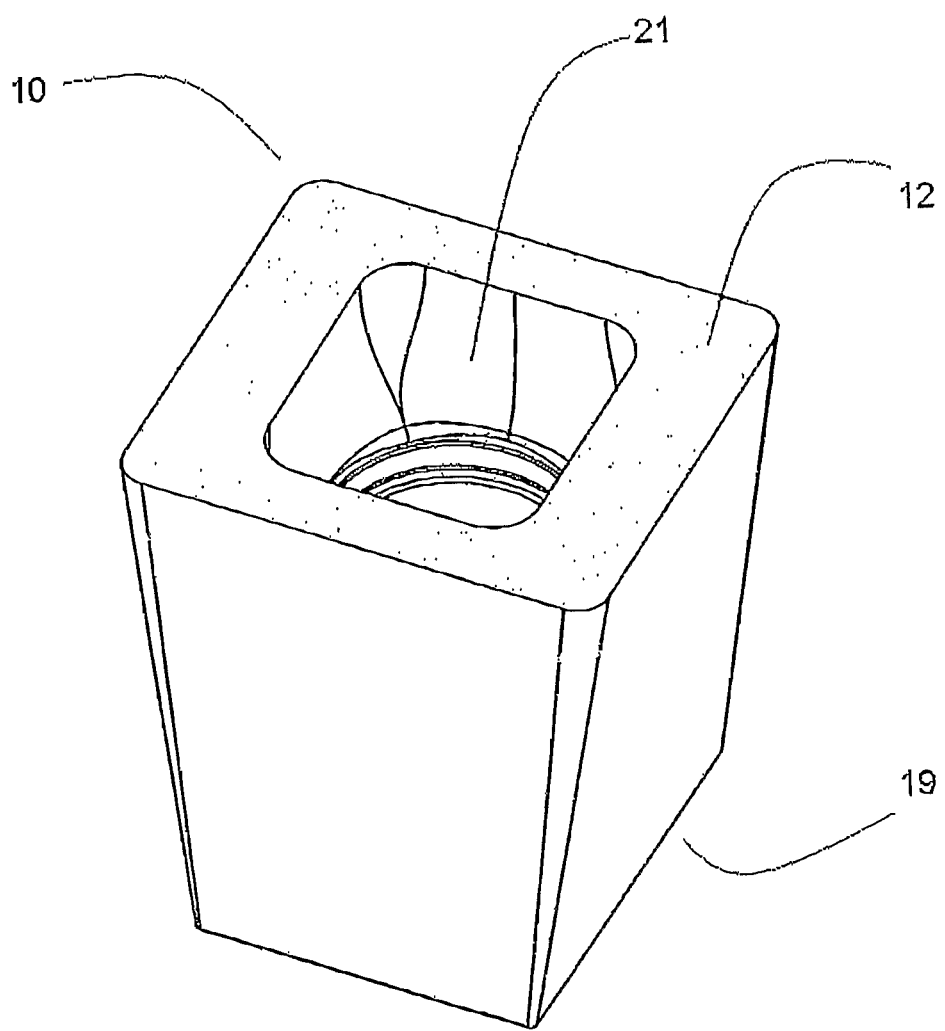
FIG. 3A-3D illustrate views of annular light guide illuminators with scattering faces according to the invention.
Figure 3B:
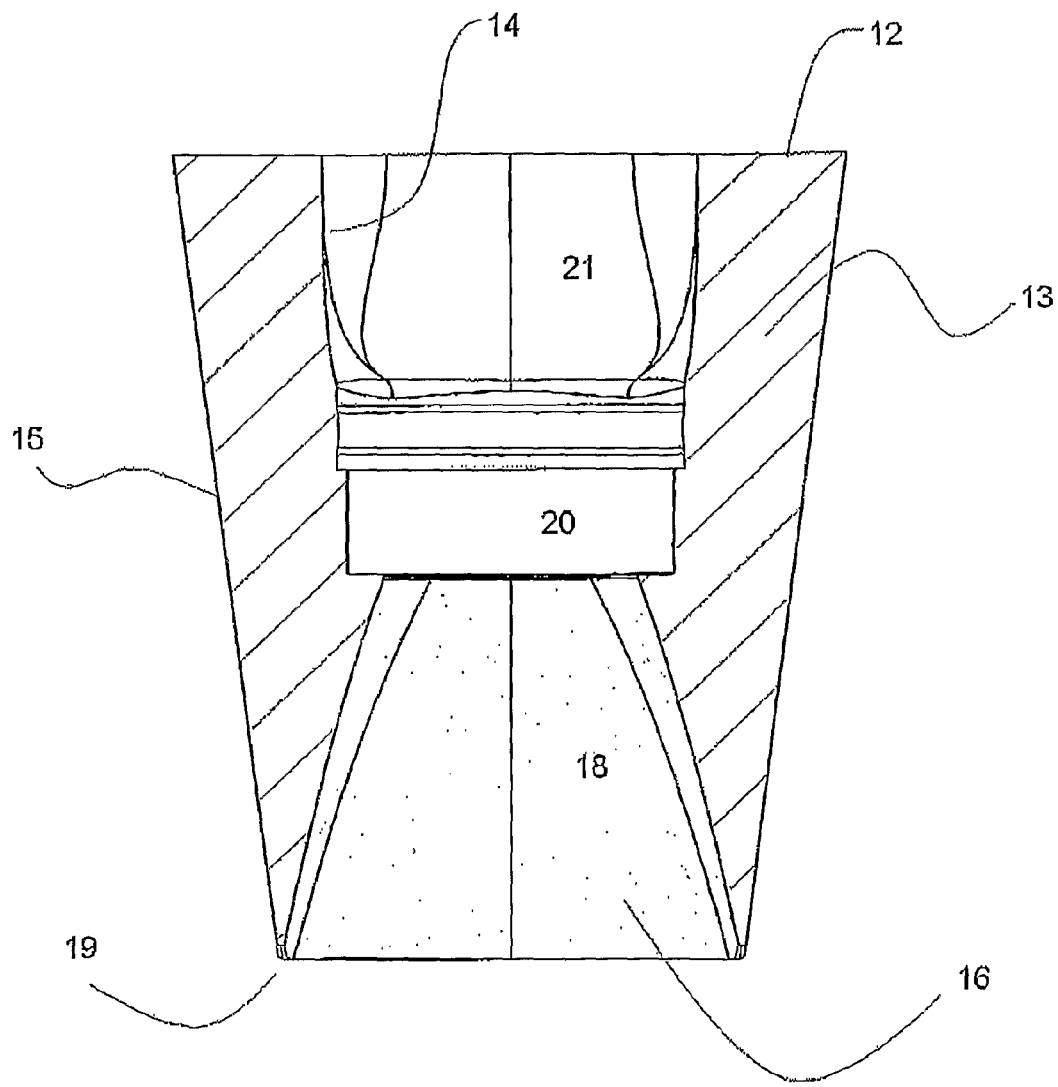
Figure 3C:
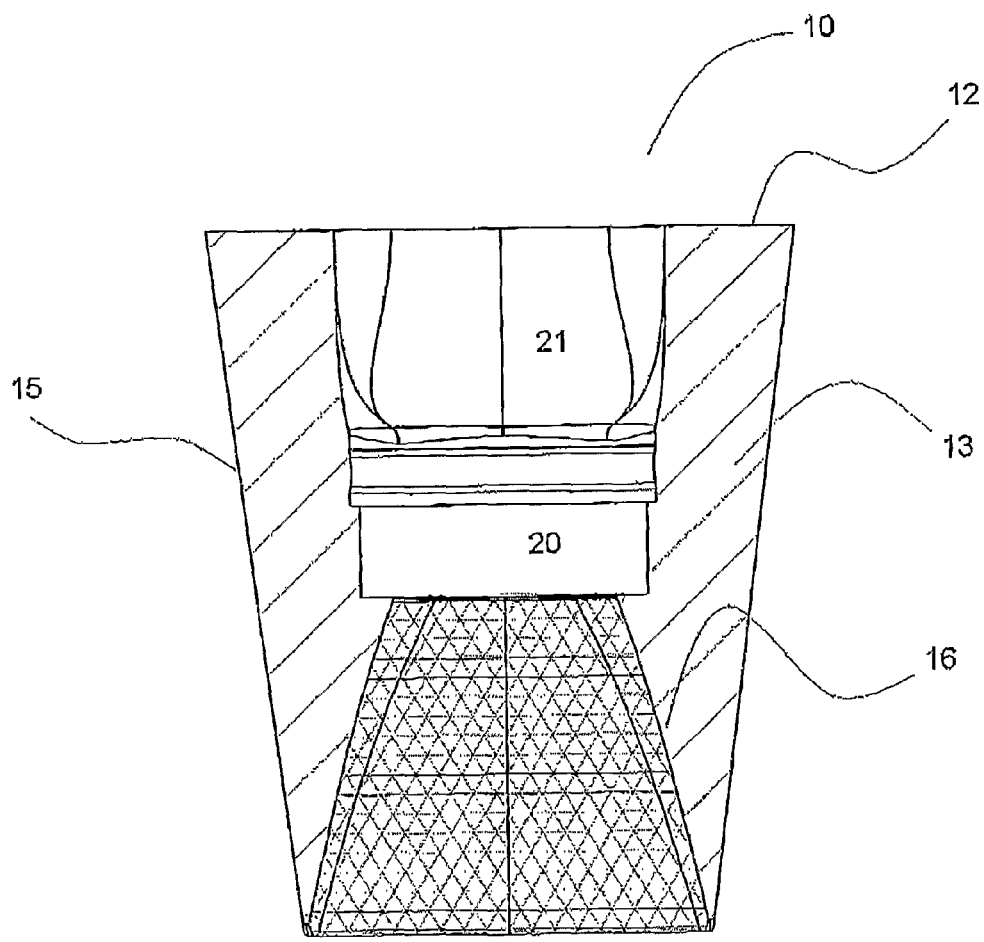
Figure 3D:
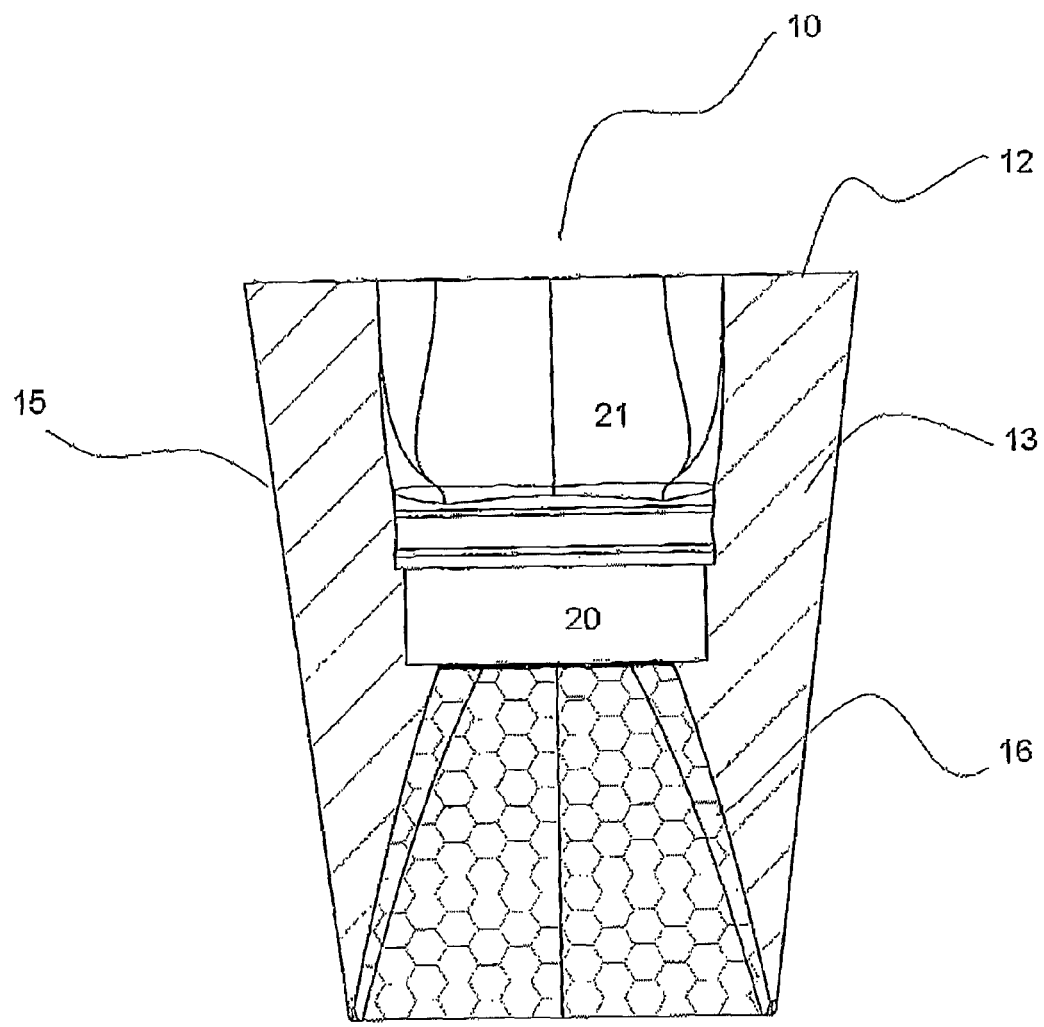

In an embodiment of the invention, the entry surface (12) of the light guide is sanded to better diffuse light (by light scattering due to the roughness of the surface) within the guiding portion (13), as illustrated in FIG. 3A. The exit surface may also be sanded to diffuse light within the inner cavity (18). Scattering has a "smoothing" effect and thus helps avoiding the formation of bright "hot" spots on a target surface of an item. This is illustrated in FIG. 3B showing a cross-sectional view of an illuminator with a sanded exit surface (15). Light scattering may also be enhanced by means of ridges (regular or not) made on the exit surface (for example), as illustrated in FIGS. 3C and 3D.

In the embodiment illustrated in FIG. 3A-D, the guiding portion (13) is a PMMA solid body for guiding UV light of wavelength typically comprised between 300 nm to 450 nm.

Figure 4A:
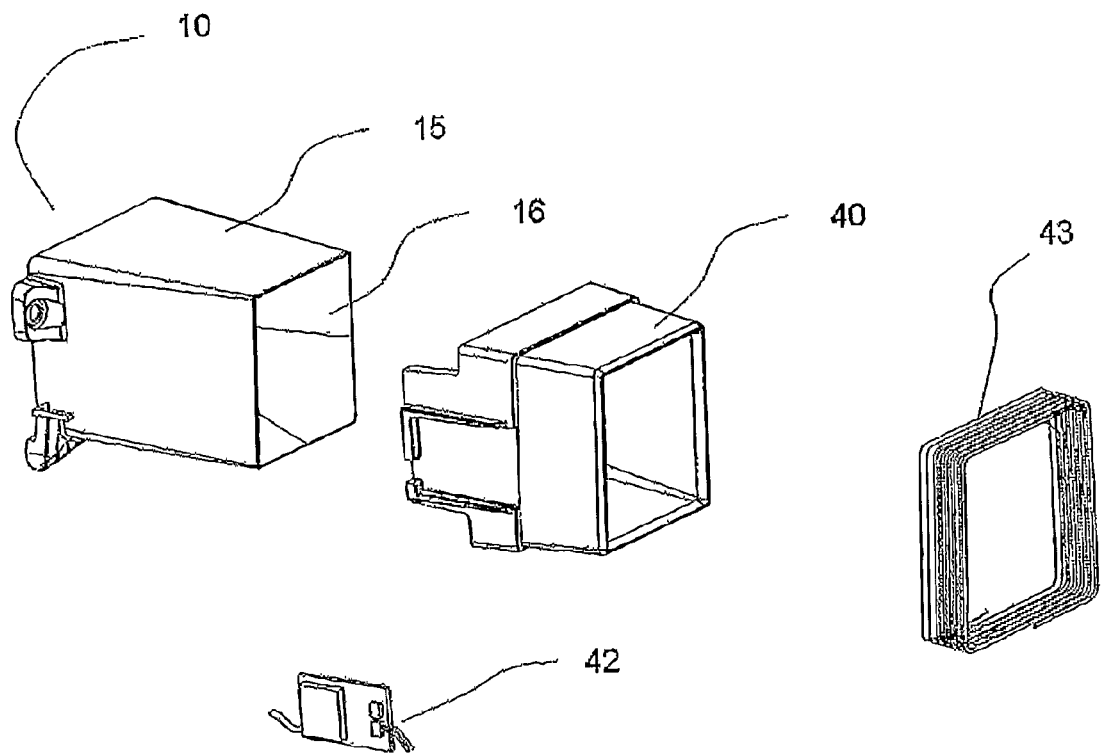
FIG. 4A illustrates exploded perspective view of a part of an illuminator according to an embodiment of the invention, which includes an RFID antenna.
Figure 4B:
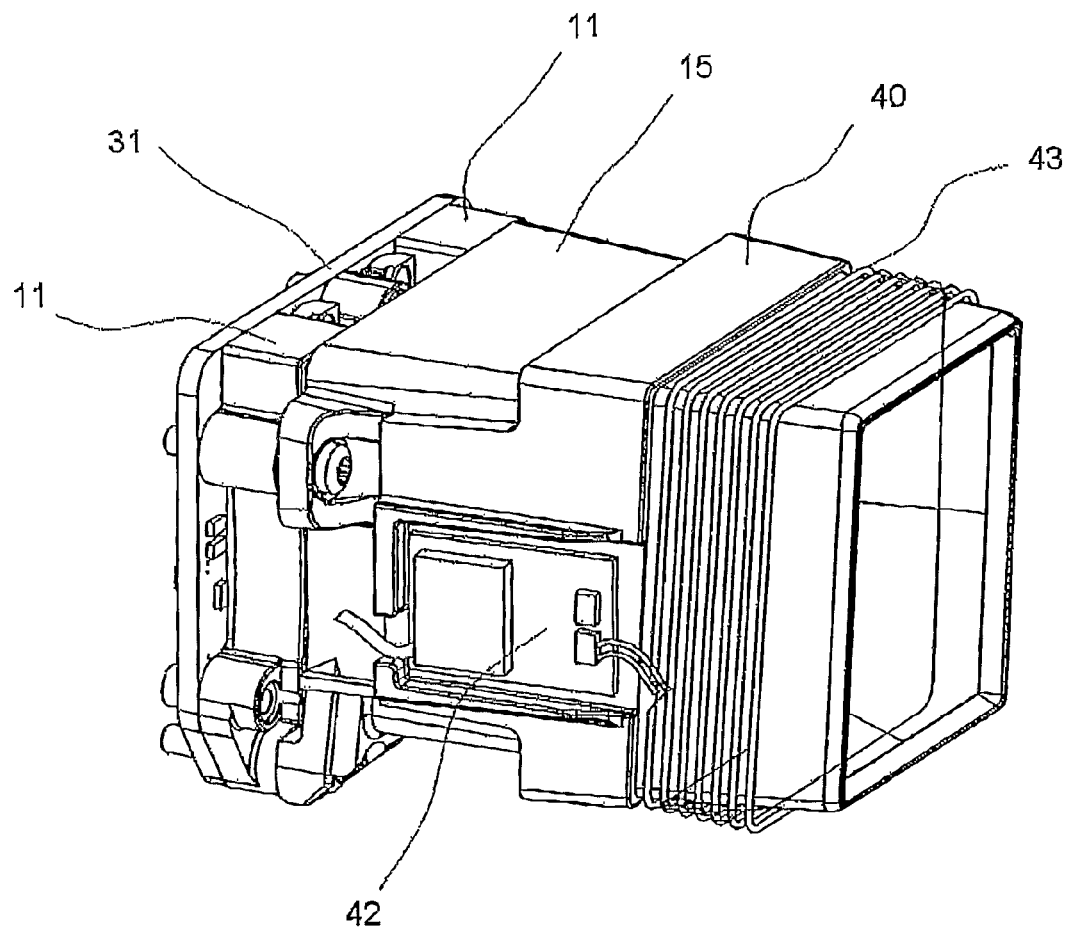
FIG. 4B illustrates a perspective view of the illuminator shown in FIG. 4A.
Figure 4C:
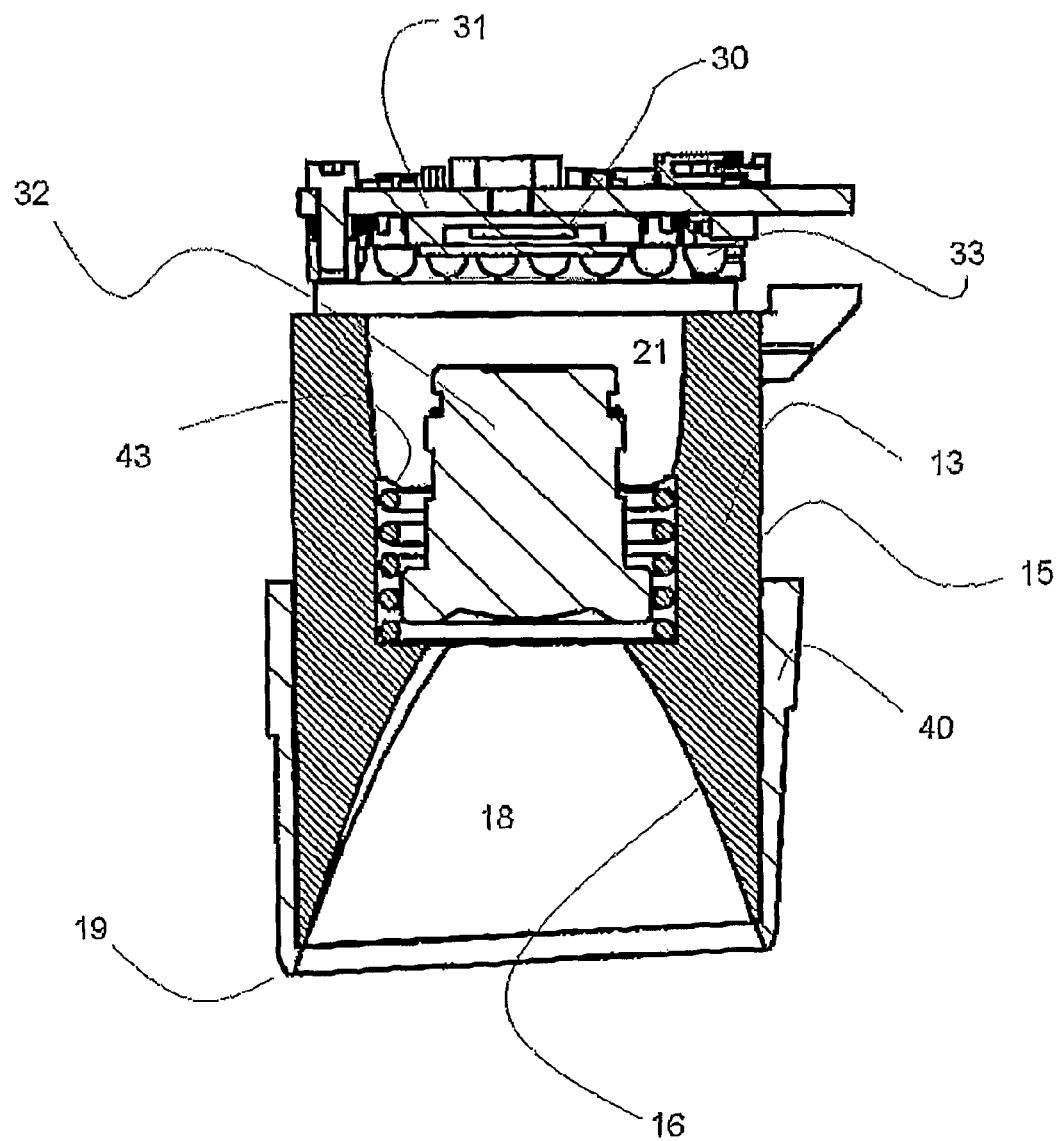
FIG. 4C illustrates a sectional view of a variation of the annular light guide illuminator shown in FIG. 4B.

In an embodiment of the invention, the illuminator is adapted for further receiving an RFID antenna. This is illustrated in FIGS. 4A and 4B, wherein an antenna (43) is wound around an outer peripheral surface of a cover (40) disposed on the outer peripheral surface (15) of the annular light guide (10), and connected to a RFID circuit (42). However, the RFID antenna may be disposed in other parts of the illuminator. As an example, FIG. 4C shows a RFID antenna (43) wound within the inner hole portion (21) of the annular light guide, around an optical device (32) for focusing light received through the truncated summit (20) of the inner cavity (18) onto the photodetector (30) mounted on the support (31). Also shown in FIG. 4D, a light source (11) which is a bar of LEDs (33) mounted on the support (31) to directly facing the entry surface (12) of the annular light guide. The RFID antenna may also have another shape (not necessarily a wound wire, depending on the RF signals to be delivered/received), as known in the art.

Figure 5:
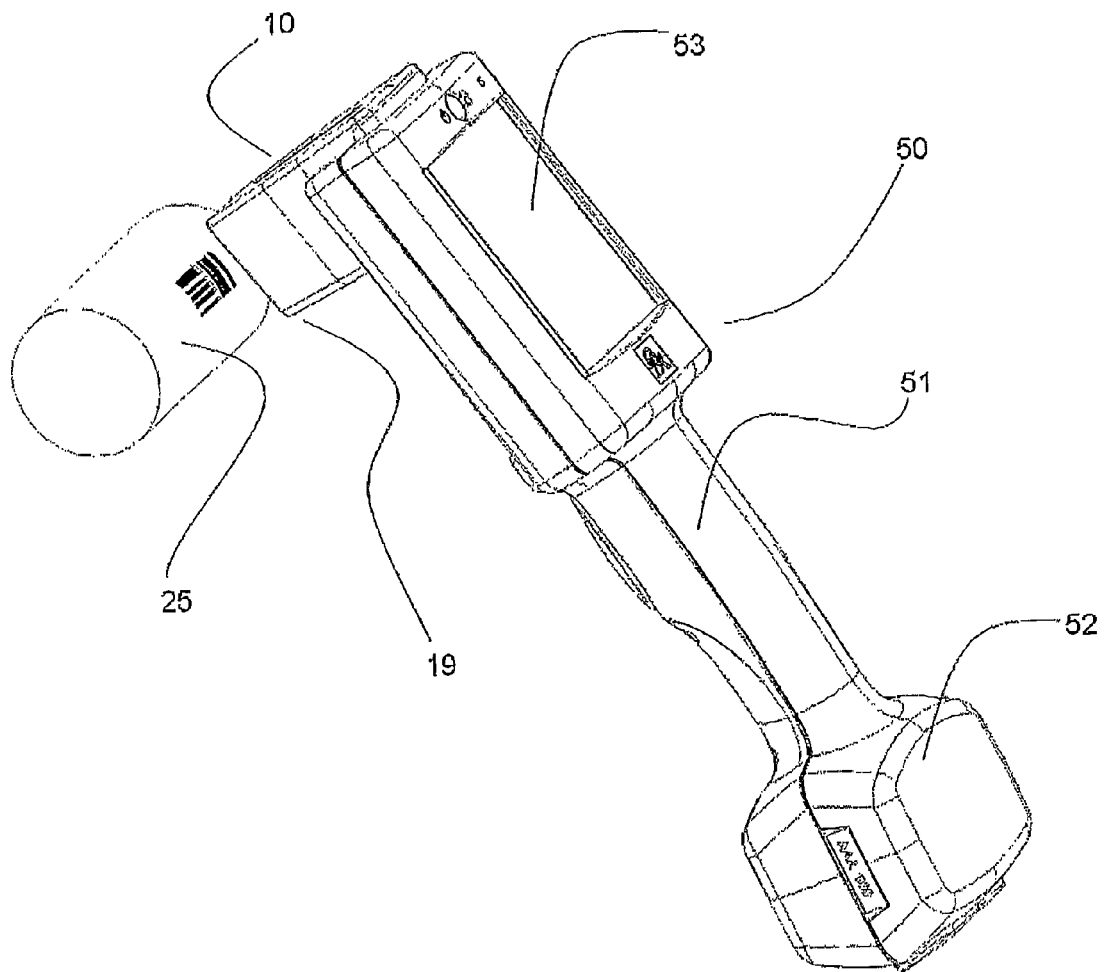
FIG. 5 illustrates a perspective view of a hand-held scanner according to an embodiment of the invention.
Figure 6:
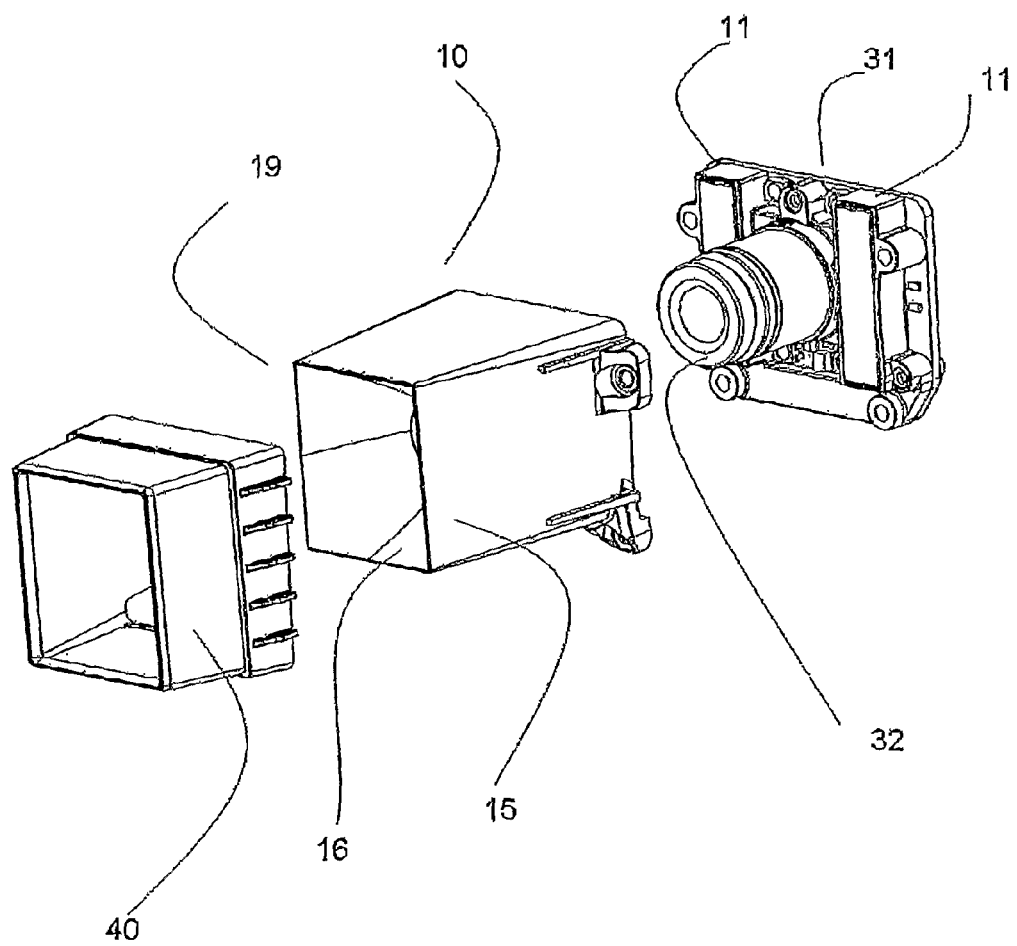
FIG. 6 illustrates an exploded perspective view of a part of the hand-held scanner shown in FIG. 5.

FIG. 5 illustrates a perspective view of a hand-held optical scanner (50) according to the invention. This scanner includes the annular light guide illuminator (10) for illuminating a portion of a surface (25) of an item (here, a can), a housing with a handle (51) easy to grasp for an operator, a power module (52) for powering the scanner, and a display (53) (LCD) with a touchpad screen to avoid buttons (a keyboard being displayed on the LCD), except for a ON/OFF/Reset button (not shown). FIG. 6 is an exploded view of the part of the hand-held scanner (50) including the illuminator (10) with a cover (40) and an optical device (32) mounted on a support (31) together with light sources (11) (the photodetector is not shown). The cordless optical scanner (50) is balanced for easier handling and includes the following components:

an optical bloc including, a light source (11) (with LEDs), the annular light guide illuminator (10), with the cover (40), for illuminating a barcode or a datamatrix on the item (25), and a CCD camera (32), mounted on the support (31);

the LCD color touch screen (53);

a main board (not represented) hosting a CPU unit for reading/decoding barcodes or matrix codes, and controlling the scanner;

a wireless communication board (GSM/GPRS);

the pack of batteries (52); and the ergonomic housing (plastic).

Several variations of the above hand-held scanner have been realized: it may either be autonomous concerning the processing operations of reading/identifying or authenticating a marking or connected to a station having said processing capabilities (in case identification or authentication of the item is carried out by comparison with data in an external database, for example), the connection with the station may be by wire (for example, via Ethernet Or phone modem) or wireless (for example, via either of Wi-Fi, GSM/GPRS or Bluetooth). Even in case of autonomous processing capabilities, the hand-held scanner may still include communication capabilities. The hand-held scanner may also be provided with connection means for charging a battery of its power module (for example, to be connected to a docking station). In a preferred embodiment, the hand-held scanner is balanced and the end of its nosepiece may further be beveled so that an operator may easily scan an item in any position (standing, squatting or kneeling, for example).

Figure 7:
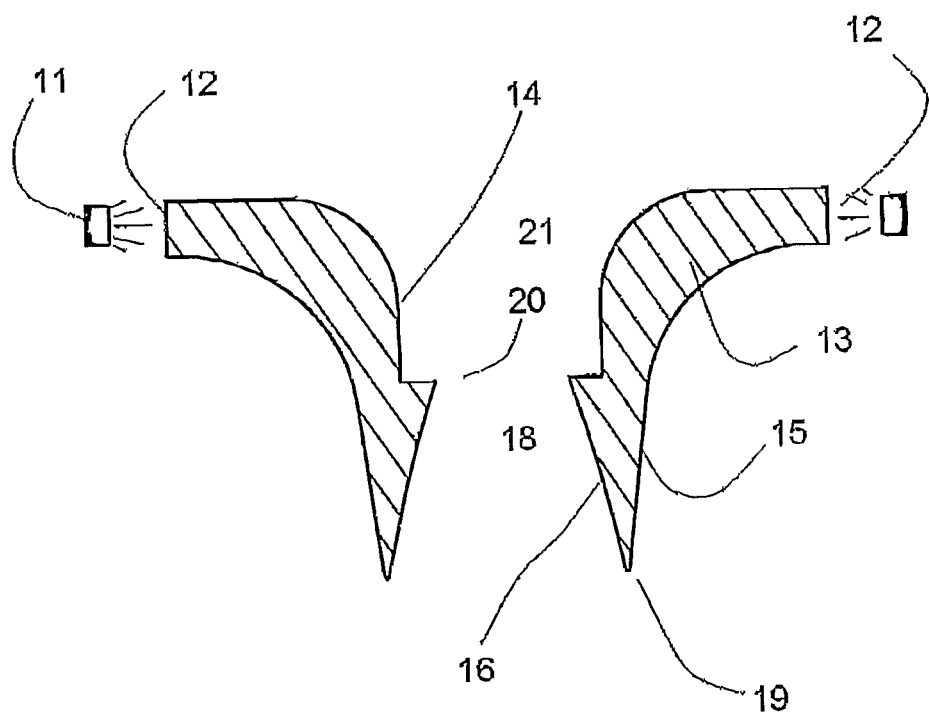
FIG. 7 illustrates a sectional view of a variation of the annular light guide illuminator according to the invention.

The invention is not limited to the above embodiments and various modifications may be made without departing from the scope of the invention as defined by the claims. For example, the shape of the illuminator may be varied (as illustrated, for example, in FIG. 7, with side entry surface (12)). Also, the above mentioned (hand-held) scanner may include the illuminator according to any of its variations and/or may be adapted for using other parts of the spectrum, still within the UV-IR range, for illuminating the target zone or detecting light reflected/emitted from this very zone.

This invention claimed is:

1. Annular light guide illuminator operable to guide light received at an entry surface to an exit surface for illuminating a zone at a distal end of said light guide illuminator, and to allow for the transmission, through an inner hole portion of said light guide illuminator, of light reflected/emitted from said zone, wherein:

said exit surface is a boundary surface portion of a truncated-cone-shaped inner cavity, a base end of which opens onto said distal end and a truncated summit end of which positioned opposite to said base end opens onto said inner hole portion;

said exit surface has a curved generatrix with a concavity oriented toward the inner cavity; and said exit surface is operable to refract light received from the entry surface to irradiate said zone with a substantially uniform light intensity distribution.

2. The annular light guide illuminator according to claim 1, wherein the generatrix is a parabola.

3. The annular light guide illuminator according to claim 1, operable to guide light corresponding to electromagnetic radiation comprised within the wavelength range of UV to IR.

4. The annular light guide illuminator according to claim 1, wherein a light guiding portion between said entry surface and said exit surface is full and made of a substantially transparent material.

5. The annular light guide illuminator according to claim 4, wherein said substantially transparent material is chosen from the group consisting of the glasses, the glass ceramic materials, the crystalline materials and the plastic materials.

6. The annular light guide illuminator according to claim 5, wherein the crystalline material is chosen from quartz, yttrium-aluminum garnet, and sapphire.

7. The annular light guide illuminator according to claim 5, wherein the plastic material is chosen from polymethylpentene (TPX), polymethyl methacrylate (PMMA), methyl methacrylate styrene copolymer (NAS), styrene acrylonitrile (SAN), polycarbonate (PC), and polystyrene (PS).

8. The annular light guide illuminator according to claim 1, wherein a portion of said exit surface or said entry surface is roughened so as to scatter light.

9. The annular light guide illuminator according to claim 1, further comprising a shield made of a material opaque to the guided light on a portion of an outer peripheral surface of said light guide illuminator.

10. The annular light guide illuminator according to claim 1, further comprising a shield made of a material opaque to the guided light on a portion of an inner peripheral surface of said light guide illuminator, in the inner hole portion of the light guide illuminator.

11. The annular light guide illuminator according to claim 1, wherein said entry surface is flat.

12. An annular light guide illuminator operable to guide light received at an entry surface to an exit surface for illuminating a zone at a distal end of said light guide illuminator, and to allow for the transmission, through an inner hole portion of said light guide illuminator, of light reflected/emitted from said zone, wherein:

said exit surface is boundary surface portion of a truncated-cone-shaped inner cavity, a base end of which opens onto said distal end and a truncated summit end of which positioned opposite to said base end opens onto said inner hole portion;

a curved generatrix of a portion of said exit surface has its concavity oriented toward the inner cavity;

said exit surface is operable to refract light received from the entry surface to irradiate said zone with a substantially uniform light intensity distribution; and an RF antenna, mounted on a portion of its peripheral boundary surface, adapted to receive and transmit an RFID signal from/to an RFID chip at said zone.

13. The annular light guide illuminator according to claim 1, further adapted to receive an optical device to collect and transmit light reflected/emitted from the irradiated zone and transmitted through the inner hole.

14. Optical scanner, comprising:

an annular light guide illuminator according to claim 13;

a light source operable to illuminate the entry surface of said light guide illuminator; and a photo-detector operable to receive light transmitted by said optical device.

15. An optical scanner comprising:

an annular light guide illuminator operable to guide light received at an entry surface to an exit surface for illuminating a zone at a distal end of said light guide illuminator, and to allow for the transmission, through an inner hole portion of said light guide illuminator, of light reflected/emitted from said zone, wherein:

said exit surface is a boundary surface portion of a truncated-cone-shaped inner cavity, a base end of which opens onto said distal end and a truncated summit end of which positioned opposite to said base end opens onto said inner hole portion;

a curved generatrix of a portion of said exit surface has its concavity oriented toward the inner cavity;

said exit surface is operable to refract light received from the entry surface to irradiate said zone with a substantially uniform light intensity distribution; and a light source operable to illuminate the entry surface of said light guide illuminator;

a photo-detector operable to receive light transmitted by said optical device; and said annular light guide illuminator is adapted to receive an optical device to collect and transmit light reflected/emitted from the irradiated zone and transmitted through the inner hole;

a RF control circuit for sending an RFID signal to an RFID chip at said zone, through said RF antenna; and a RFID reader operable to read an RFID signal received from said RFID chip.

16. The optical scanner according to claim 14, being a hand-held scanner including a power module for supplying power to the scanner.

17. The optical scanner according to claim 16, further comprising at least one of a wireless communication module, a display module for displaying measured data or scanning parameters, and a controlling interface for inputting scan conditions.

\* \* \* \* \*

UNITED STATES PATENT AND TRADEMARK OFFICE
CERTIFICATE OF CORRECTION

PATENT NO. : 8,894,260 B2  
APPLICATION NO. : 13/262111  
DATED : November 25, 2014  
INVENTOR(S) : Milan Vasic et al.

Page 1 of 1

It is certified that error appears in the above-identified patent and that said Letters Patent is hereby corrected as shown below:

On the Title Page, Item (73) Assignee, "SICPA Holding SA" should read --SICPA HOLDING SA--.

Signed and Sealed this
Eighth Day of December, 2015

Michelle K. Lee
*Director of the United States Patent and Trademark Office*